United States Patent
Consonni et al.

(10) Patent No.: US 6,647,187 B2
(45) Date of Patent: Nov. 11, 2003

(54) SUBMARINE OPTICAL CABLE RESISTANT TO LONGITUDINAL WATER PROPAGATION

(75) Inventors: Enrico Consonni, Seregno (IT); Giovanni Brandi, Milan (IT); Alessandro Ginocchio, Sesto San Giovanni (IT); Feliciano Cecchi, Inveruno (IT)

(73) Assignee: Pirelli Cavi e Sistemi S.p.A., Milan (IT)

(*) Notice: Subject to any disclaimer, the term of this patent is extended or adjusted under 35 U.S.C. 154(b) by 0 days.

(21) Appl. No.: 10/055,942

(22) Filed: Jan. 28, 2002

(65) Prior Publication Data

US 2002/0136513 A1 Sep. 26, 2002

Related U.S. Application Data (63) Continuation of application No. PCT/EP00/06528, filed on Jul. 10, 2000.
(60) Provisional application No. 60/147,025, filed on Aug. 3, 1999, and provisional application No. 60/180,207, filed on Feb. 4, 2000.

(30) Foreign Application Priority Data

Jul. 28, 1999 (EP) .............................. 99114716
Jan. 31, 2000 (EP) .............................. 00101878

(51) Int. Cl.$^7$ .............................................. G02B 6/44
(52) U.S. Cl. ................................................... 385/113
(58) Field of Search ................................. 385/112, 113, 385/114

(56) References Cited

U.S. PATENT DOCUMENTS

| | | |
|---|---|---|
| 4,684,213 A | 8/1987 | Ishihara et al. |
| 4,741,592 A | 5/1988 | Secco et al. |
| 4,852,790 A | 8/1989 | Karlinski |
| 5,125,062 A | 6/1992 | Marlier et al. |
| 5,143,274 A | 9/1992 | Laupretre et al. |
| 5,231,260 A | 7/1993 | Yoshie et al. |
| 5,380,977 A | 1/1995 | Yoshie et al. |
| 5,455,881 A | 10/1995 | Bosisio et al. |
| 5,463,711 A | 10/1995 | Chu |
| 5,715,343 A | 2/1998 | Anelli et al. |
| 5,760,364 A | 6/1998 | Marlier et al. |

FOREIGN PATENT DOCUMENTS

| | | |
|---|---|---|
| DE | 26 35 917 | 2/1978 |
| DE | 43 38 761 | 5/1995 |
| EP | 0 240 165 | 10/1987 |
| EP | 0 263 363 | 4/1988 |
| EP | 0 883 007 | 12/1998 |
| FR | 2 497 964 | 7/1982 |
| FR | 2 534 385 | 4/1984 |
| FR | 2 562 272 | 10/1985 |
| WO | WO 96/15466 | 5/1996 |

OTHER PUBLICATIONS

Felico; "A New–Repeatered Achievement" Telecom Report International 19, pp. 22–25, (1996).

Libert et al.; "A New Undersea Cable for the Next Millenium"; conference proceedings Subpotic, pp. 121–128, (1997).

Primary Examiner—Khiem Nguyen
(74) Attorney, Agent, or Firm—Finnegan, Henderson, Farabow, Garrett & Dunner, L.L.P.

(57) ABSTRACT

A submarine optical cable having a central polymeric buffer tube, said cable being particularly suitable for long-haul repeatered systems. A longitudinal reinforcing element is embedded into the walls of the central polymeric buffer tube which is of relatively small dimensions. The presence of said reinforcing element allows a precise control over the excess fiber length within the buffer tube. This reinforcing element is of relatively small diameter, in order to comply with the requirements of reduced dimensions of the buffer tube. Notwithstanding this relatively small diameter, said longitudinal reinforcing element allows for a good control over the longitudinal shrinkage of the polymeric buffer tube within the submarine cable.

30 Claims, 3 Drawing Sheets

SUBMARINE OPTICAL CABLE RESISTANT TO LONGITUDINAL WATER PROPAGATION

CROSS REFERENCE TO RELATED APPLICATIONS

This application is a continuation of international application number PCT/EP00/06528, filed Jul. 10, 2000, the content of which is incorporated herein by reference, and claims the priority of European Patent Application Nos. 99114716.6, filed Jul. 28, 1999, and 00101878.7, filed Jan. 31, 2000, and the benefit of U.S. Provisional Application No. 60/147,025, filed Aug. 3, 1999, and 60/180,201, filed Feb. 4, 2000, the content of both of which is incorporated herein by reference.

BACKGROUND OF THE INVENTION

1. Field of the Invention

The present invention relates to a submarine optical cable comprising a central polymeric buffer tube, said cable being particularly suitable for long-haul repeatered systems.

Submarine cables for long-haul repeatered systems are typically required to contain a relatively small number of optical fibers, the maximum number of optical fibers being determined by the capacity of optical amplifiers-repeaters. Accordingly, the fiber count for submarine optical cable for long-haul repeatered systems is typically from a minimum of 4 fibers up to a maximum of 48 fibers.

The total length of long-haul submarine cables (also called "segments") is typically of about 1500–2000 km. These lengths are generally formed by a number of optical cable spans (50–80 Km length), generally separated from each other by amplifiers. The cable-spans are preferably joined together with the amplifiers in the manufacturing plant, in order to manufacture the final 1000–2000 Km length segments which are then loaded on the cable laying ship. The total length of repeatered submarine systems may vary from about 1000 to about 10000 Km, joining two or more of the above segments, if necessary.

2. Description of the Related Art

In view of the low fiber-count capacity requirements and of their relatively long length, these types of cables are thus typically of reduced dimensions, comprising a single central buffer tube carrying the optical fibers. The inner diameter of said fiber-containing buffer tube is generally lower than about 5 mm.

On the other side, fiber-count requirement for submarine cables for non-repeatered systems is generally higher (e.g. up to about 96 fibers) and thus the dimensions of said cable can be, if necessary, increased accordingly. The length of said cables is generally of about 50–150 Km, up to a maximum length of 400–500 km.

A number of cables designs for submarine installation is known in the art.

For instance, U.S. Pat. No. 5,125,062 discloses an undersea cable comprising a central metallic tube, filled with a sealing compound, e.g. silica gel, and containing optical fibers embedded therein, said tube being surrounded by a helical lay of metallic (preferably steel) wires. Interstices between wires and between the helical lay and the central tube are filled with a sealing material (preferably polyurethane resin) which opposes longitudinal propagation of water along the cable. Alternatively, the central tube can be made of plastic and in this case the helical lay also presents the characteristics of an arch for withstanding pressure.

U.S. Pat. No. 4,684,213 relates to a submarine cable comprising a pressure resistant steel tube containing optical fibers, surrounded by two layers of steel wires and by an outer metal tube made of copper or aluminum. Dams of a sticky compound and/or of a jelly of plastic material are disposed at regular intervals inside the central tube and in the gaps between the lay of wires disposed between the central tube and the outer tube.

U.S. Pat. No. 5,463,711 discloses an underwater cable for shallow-water, comprising a central tube made of metal, optical fibers arranged within said tube and surrounded by a water blocking material and six steel wires wound in a helical lay around the central tube.

In the article of D. Felicio, "A non-repeatered achievement", Telcom report International 19 (1996), pp. 22–25, a submarine cable for non-repeatered systems is disclosed (MINISUB CT®), where the fibers are accommodated into an hermetically sealed central copper tube having an outer diameter of about 5 mm. Said cable is presented in this document as an evolution of a previous cable design (MINISUB 16C®) comprising a central plastic buffer tube surrounded in turn by a hermetic copper tube (6.1 mm diameter).

In the article of J. F. Libert et al., "A New Undersea Cable For The Next Millenium", Conference Proceedings Suboptic '97, pp. 120–128, a deep-water light weight cable specifically designed for long haul repeatered systems is disclosed. Said cable comprises Large Effective Area (LEA) fibers housed within a jelly filled welded steel tube, which acts as a pressure-resistant component in the cable. The manufacturing process of the tube is controlled in order to provide a small excess length fiber (0.1%). As disclosed in said article, the combination of the slight excess fiber, jelly filling and pressure resistant tube provides a very low stress environment for the fibers, which minimize loss increments in the more bend-sensitive fibres that may be used in wavelength-division-multiplexing (WDM) and high bandwidth systems. As shown in said article, LEA fibers are much more sensitive to bending-induced loss than standard dispersion-shifted fibers (SDS fibers) currently in use.

In view of the above, it is thus apparent that current trends in the production of optical buffer tubes having relatively small dimensions, for use in submarine cables, are in the direction of using metal tubes.

Applicant has however observed that the production of metal buffer tubes of small dimensions (e.g. less than about 6 mm of outer diameter) may be somehow difficult, due to a series of drawbacks.

For instance, optical fibers can be subjected to an undesired over-heating during the welding of the metal tube, with the possibility of being damaged. For avoiding or at least limiting the effects of fiber overheating, a number of technical solutions are provided in the prior art, which solutions however introduce further operative steps or control techniques into the production process. For instance, U.S. Pat. No. 4,852,790 discloses to focalize a laser light above the surface of the tube, in order to weld and hermetically seal the abutted edges of the metal strip without excessive overheating of the underlying structure. U.S. Pat. No. 5,380,977 discloses the use of an optical fiber guide for guiding the optical fibers inside the metal tube, said guide being elastically urged on an inner wall opposite to the welded portion of the metal tube. U.S. Pat. No. 5,760,364 discloses a thermal diffuser interposed between the auxiliary tube for inserting optical fibers into the metal tube and the closure zone that is defined on said metal tube.

In addition, specific techniques and devices should be applied in order to achieve an optimal control on the excess fiber length value inside metallic tubes. For instance, U.S. Pat. No. 4,852,790 discloses the use of a gas flow inside the metal tube for blowing the optical fibers against the outer circumference of the metal tube as the metal tube wraps around the wheel. U.S. Pat. No. 5,231,260 discloses means for the control of the fiber excess length inside a metal tube, which comprises tension adjusting means for optical fiber and for the metal strip forming the metal tube and traction means, including tension variable means, for the metal tube. U.S. Pat. No. 5,143,274 discloses a method for manufacturing a metal tube containing a predetermined excess length of optical fibers, which comprises controlling the fiber speed, the temperature of the metal tube and the pull out tension of the tube.

Applicant has now observed that it would be advantageous to use polymeric materials for manufacturing such buffer tubes. However, Applicant has also observed that polymeric buffer tubes having reduced dimensions may pose additional problems, with respect to metallic tubes, as explained in the following.

In order to reduce the stresses on the optical fibers, it is preferable to lay the optical fibers inside the tube with substantial no excess length or with a slight excess (less than about 0.1%) with respect to the length of the buffer tube. If the fiber is disposed inside a buffer tube with an excess length, its path within the buffer tube will not be linear but the fiber will be disposed on a sinusoidal/helical path. The higher the fiber excess length, the more apparent the sinusoidal/helical path.

In this connection, Applicant has however observed that excess lengths higher than about 0.1% are incompatible with small inner diameter buffer tubes (typically less than about 3 mm for fiber count of 12÷24). In fact, if said excess length is too high (e.g. more than about 0.1%), the sinusoidal/helical path of the fiber will contact the walls of the buffer tube, with consequent problems of microbending and macrobending on the fiber. On the other side, buffer tubes with larger inner diameters may allow higher excess lengths, as the sinusoidal/helical path of the optical fiber within the buffer tube can be arranged within a larger cross-sectional area.

However, Applicant has observed that with the conventional polymer materials used to manufacture buffer tubes and with the conventional extrusion techniques, it is very difficult to have a sufficiently precise control over the selected excess fiber.

In particular, as observed by the Applicant, excess fibre length variations must be controlled both during the manufacturing stage of the buffer tube on the extrusion line and during the storage period of the buffer tube (the tube being typically wound on a storage reel at the end of the manufacturing process). Typically, storage periods (i.e. the period between the wounding of the tube on the reel and its use to make the cable) may vary from several hours to approximately one week.

Fibre excess length in polymeric buffer tubes is generally obtained by acting through the thermal properties of the polymeric materials forming the tube. In fact, the extruded tube, upon cooling, tends to substantially reduce its overall length due to the relatively high thermal coefficient of expansion of polymeric materials (e.g. from about $50 \times 10^{-6}$ 1/° C. to about $300 \times 10^{-6}$ 1/° C., depending on the specific material, the extrusion conditions, etc.). Thus if optical fibers are supplied without substantial tension to the extruder with the same speed of the extruded tube leaving the extruder, and if the material forming the buffer tube has a longitudinal contraction upon cooling of e.g. about 0.1%, the resulting excess fiber will be of about 0.1% at the end of the extrusion process. Said excess length may be further modified by unwinding the optical fibers from the pay-off bobbins with a predetermined tension. In this case the fiber will be housed into the buffer tube with a minor length than if it had been tensioned, thus obtaining a final excess length fiber lower than the one obtainable without applying said tension to the fibers. Anyhow, whichever manufacturing method is applied, it is generally possible with the known manufacturing technologies to obtain, at the end of the extrusion process, buffer tubes with relatively reduced deviations (+/−0.02%) from a predetermined excess length value.

The Applicant has however observed that once the buffer tubes made according to known techniques are collected (e.g. on a reel), the polymeric material forming the tube tends to additionally settle and, in particular, to shrink. This settling generally cannot be foreseen; however, it usually causes additional tube shrinking leading to uncontrollable variations (usually an increase) of the set excess fibre values.

This shrinking during the storage period of the tubes, as observed by the Applicant, may in some cases result in variations of the excess length comparable to the predetermined excess length value, with the result of substantially modifying the final excess fibre value and creating problems in the subsequent use of the tube in making the optical cables.

In particular, the applicant has observed that, at high production speeds, the tube is typically wound on the reel in random crossed turns. This unorderly tube winding generates gaps randomly distributed on the tube skein collected on the reel. The tube may detensionate more easily near these gaps and shrink, while detensioning may be obstructed in other areas. This causes different, uncontrollable shrinking of the tubes wound on different reels and also along different lengths of the same tube wound on the same reel.

Thus, in case of a predetermined value of excess fiber length of e.g. about 0.1%, applicant has measured, after a storage period of about one week, a final excess length of from about 0.12% to about 0.3%, depending on the different materials, extrusion and storage conditions. While a certain variation of the value of excess fibre length with respect to the predetermined one value can be acceptable for buffer tubes having a relatively large internal diameter (e.g of about 10 mm or more), Applicant has observed that even small variations with respect to the predetermined value are however hardly acceptable for buffer tubes having a relatively small internal diameter (e.g. below 5–6 mm). As a matter of fact, if said variation is too large, it may cause the fiber to be disposed onto a path where the fiber is forced into contact with the inner wall of the buffer tube thus causing microbending effects onto the fiber. Applicant has noticed that this problem becomes much more relevant when LEA fibers are used, which fibers are more sensitive to microbending and macrobending phenomena. The term LEA fibers is intended to encompass within its meaning those optical fibers having a large effective area, in particular optical fibers having an effective area of at least 7 $\mu m^2$ or greater.

It goes without saying that by using a metal buffer tube, the predetermined value of excess fiber length remains substantially unaltered after the completion of the manufacturing process and during the subsequent storage of the buffer tube, as metal materials are substantially insensible to post-production shrinkage.

Applicant has now found that it is however possible to produce a submarine cable with a central polymeric buffer tube of reduced dimensions, wherein the excess fiber length can be controlled within a limited desired range with respect to a predetermined value of excess fiber length.

In particular, Applicant has found that such excess fiber length can be controlled by embedding a longitudinal reinforcing element within the walls of the polymeric tube. This reinforcing element should however be of relatively small diameter, in order to comply with the requirements of reduced dimensions of the buffer tube. Applicant has observed that, notwithstanding this relatively small diameter, said longitudinal reinforcing element allows for a good control over the longitudinal shrinkage of the polymeric buffer tube within the submarine cable.

Applicant has furthermore observed that for such buffer tube of relatively small internal diameter (e.g. below about 3 mm), it is rather difficult to achieve a complete filling of said tube with a suitable water-blocking gel. As a matter of fact, because of the relatively small diameter of buffer tubes specifically adapted for submarine cables and of the relatively high viscosity of the filling jelly compound (generally from about 50 Pa·s to about 220 Pa·s), the filling of the tube can only be completed for about 80–95% of the internal volume of the tube. In addition, an incomplete filling of the buffer tube may be desirable in some instances, also for buffer tubes of larger dimensions. For instance, as disclosed in European Patent Application Publ. No. EP 883007, if optical fibers are exposed to hydrogen gas, the transmission properties thereof are altered, the higher being the partial pressure of hydrogen the more relevant said alterations. EP 883007 thus suggests filling only partially the buffer tube with a filling material (maximum 95%), in order to leave an expansion volume inside the tube so that the partial pressure of hydrogen is kept relatively low.

Typically, from about 5 to about 20% of the internal volume of the buffer tubes can be left free from water blocking gel material.

Applicant has observed that, while this incomplete filling can be considered of relatively low importance for terrestrial cables (where longitudinal water penetration tests are conducted under a water head of 1 m), it becomes much more important for underwater cables. As a matter of fact, Applicant has observed that the voids due to the incomplete filling tend to dispose longitudinally along the whole length of the buffer tube, thus creating a preferential path along which a high pressure water flow (e.g. of about 500 bars if the cable is laid at a depth of about 5000 m) can flow with relatively low head losses for a relevant length of the cable before being blocked.

In addition, if water has a preferential flow path inside the buffer tubes, the respective hydrostatic pressure may act on the inner surface of the plastic tube, thus increasing the diameter of the same; as a consequence, the flow path is increased in dimension and the water flow increases the speed and the penetration length inside the buffer tube.

SUMMARY OF THE INVENTION

Applicant has now found that by providing a suitably dimensioned longitudinal cavity (or "gap") defined along the outer surface of the above mentioned polymeric buffer tube containing optical fibers, it is possible to substantially reduce the longitudinal flow of water inside said buffer tube. In particular, the Applicant has observed that the dimensions of the longitudinal space surrounding the buffer tube should be selected in order to provide along said space a preferential flow path for the water accidentally penetrated inside the cable, with respect to the flow path inside the buffer tube, thus preventing water from flowing inside said buffer tube. In other terms, the head losses of the water flowing along said longitudinal space surrounding the buffer tube should be lower than the head losses of the water flowing inside said buffer tube. As a consequence, the hydrostatic pressure of the water penetrated into the above gap acts onto the outer surface of the polymeric buffer tube, thus allowing an effective compression of said buffer tube with a consequent reduction of the cross-sectional area of the tube and a corresponding further increase of the head losses inside said buffer tube.

Thus, a submarine cable according to the present invention comprising a buffer tube having at least one reinforcing element embedded in the walls thereof allows both an effective control over the predetermined excess fiber length inside said tube and over the longitudinal water penetration along said tube.

According to one aspect of the present invention, a submarine cable is provided comprising:

a polymeric buffer tube, defined by peripheral walls and containing at least one tubular passage, said tubular passage containing at least one optical fiber loosely housed therein;

a substantially non-deformable and hermetic elongated hollow body defined by an inner and an outer surface, said inner surface being disposed to longitudinally surround said polymeric buffer tube;

wherein at least one reinforcing element longitudinally extending along the whole length of the tube is embedded in the peripheral wall of the of said buffer tube.

In order to control the excess fiber length and, particularly, the post-extrusion shrinkage of the buffer tube, said reinforcing element preferably has a longitudinal stiffness higher than that of the polymeric buffer tube, preferably at least four times greater than that of the polymeric buffer tube. The longitudinal stiffness of an elongated element is defined as the product of the cross section area of said element times the Young modulus of the material forming said element.

According to a preferred embodiment, the material forming said reinforcing element has an elastic limit of at least 0.2%, preferably up to about 0.5%.

Typically, said reinforcing element has a substantially circular cross-section, with a diameter of from about 0.3 mm to about 0.8 mm, preferably of from about 0.4 mm to about 0.6 mm. Preferably, said reinforcing element is a metal wire, in particular a steel wire.

According to a preferred embodiment said tubular passage has a diameter not greater than about 3 mm, preferably not greater than about 2 mm. The outer diameter of the buffer tube can advantageously be less than about 6 mm, preferably less than about 5 mm. The thickness of the walls surrounding the tubular passage can vary from about 0.2 mm to about 0.5 mm.

According to a preferred embodiment, said substantially non-deformable and hermetic elongated hollow body comprises:

an inner layer comprising at least one annular lay of metal wires, e.g. of steel, preferably wound as a helical lay around the buffer tube, said helical lay presenting the characteristics of an arch for withstanding the relevant hydrostatic pressure at the selected depth; and an outer layer comprising a metal tube, e.g. of copper or aluminum, conferring the hermetic protection (from possible radial penetration of water or gases) to the inner structure of the cable.

Preferably, said metal tube is formed onto said annular lay of metal wires.

Alternatively, said substantially non-deformable and hermetic elongated hollow body surrounding the tube can be a metal tube, made of e.g. copper, steel or aluminum, having a predetermined thickness, elastic modulus and yield strength so as to resist to a selected hydrostatic pressure. Such a metallic tube provides an hermetic protection towards radial penetration of water or gases into the inner structure of the cable where the optical core is located and can be used, in particular if it is made of copper, for supplying electric power to the system components.

According to a preferred embodiment, a longitudinal cavity is defined between the outer surface of the polymeric buffer tube and the inner surface of said non-deformable elongated hollow body, said cavity being at least partially filled with a water-blocking element and having a size such that, in case of accidental ingress of water inside said cable:

a water flow through said polymeric buffer tube is caused to have a first head loss;

a water flow through said longitudinal cavity is caused to have a second head loss;

said second head loss being lower than said first head loss.

Advantageously, the head losses of the water flow along said longitudinal cavity can be lower than about 75% of the head losses of the water flow inside the polymeric buffer tube, preferably lower than about 50%, and more preferably lower than about 30%.

The polymeric material forming the buffer tube can be advantageously selected from the group consisting of polyester (e.g. polybutyleneterephtalate), polyolefin (e.g. polyethylene, polypropylene, copolymer ethylene-propylene), or polyamide. The tube may comprise one or more layer of said polymeric materials. The polymeric material forming the tube will have a predetermined thickness and elastic modulus so that when a hydrostatic pressure of a selected degree is applied on the outer surface of said tube (as a consequence of the water penetration at the relevant laying depth of the cable), the tube is sufficiently compressed so as to reduce the void volume inside the mass of the filling material, thus reducing the distance covered by the water flow. Advantageously, the compression of said tube should be such as to reduce its original cross-sectional area of at least about 3%, preferably of at least 5%, when subjected to the relevant hydrostatic pressure.

The water-blocking element disposed within the longitudinal cavity along the polymeric buffer tube should be such as to allow the water penetrating in said longitudinal cavity to flow with less head losses than inside the polymeric buffer tube at the initial stage of the penetration, while allowing said head losses to gradually increase in time, eventually blocking the flow of water in said longitudinal cavity within a predetermined length of the cable from the inlet point of the water.

In general, the block of water is intended to be effective if water penetrates inside the cable for a distance of less than 1000 meters in two weeks at a pressure of 550 bar.

Preferably, said water blocking element is a filling material, e.g. an elastomer such as polyurethane or a jelly-like composition, discontinuously disposed along the longitudinal direction of said longitudinal passage.

Alternatively, said water blocking element is a water blocking tape which is wrapped around the buffer tube.

BRIEF DESCRIPTION OF THE DRAWINGS

For a better comprehension of the invention, the following drawings are given.

DETAILED DESCRIPTION OF EXEMPLARY EMBODIMENTS

Figure 1:
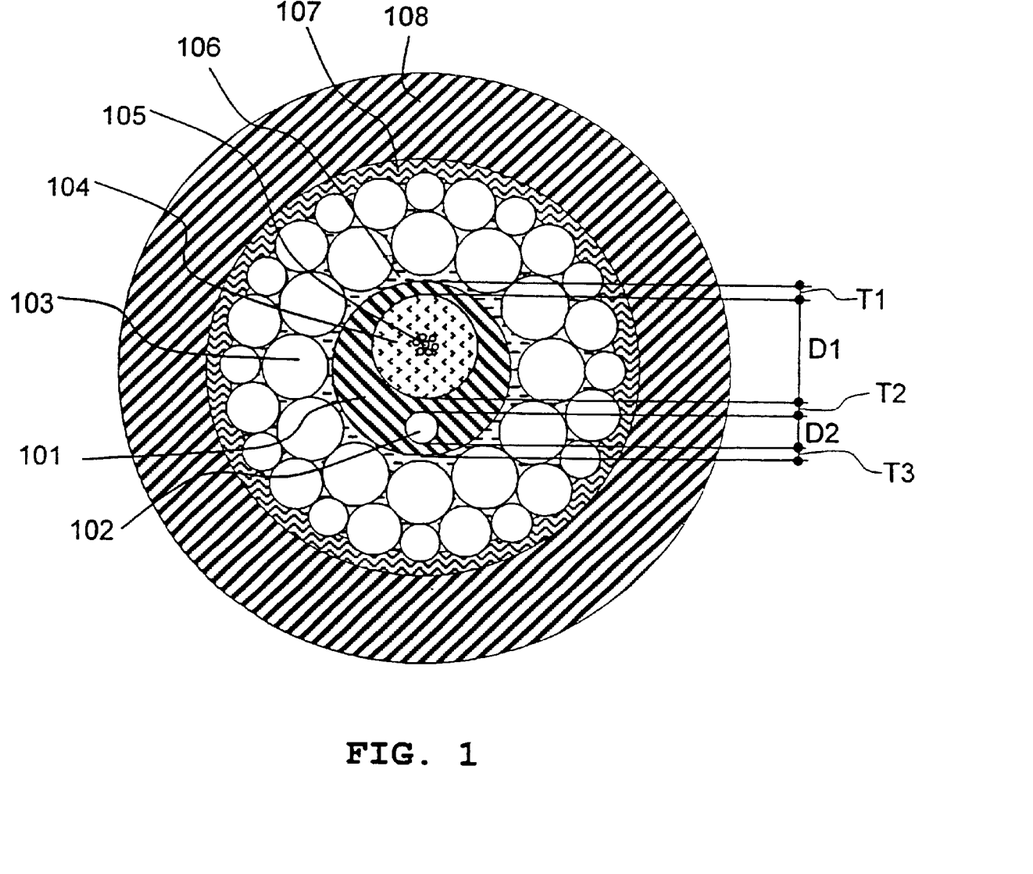
FIG. 1 is a cross-sectional view of a cable according to the invention.

FIG. 1 shows a an embodiment of a cable according to the invention, wherein a single polymeric buffer tube (101), comprising a reinforcing element (102) is centrally disposed within a layer of metallic wires (103).

The polymeric material which forms said buffer tubes should have a sufficiently high elastic modulus (e.g. of at least about 200, preferably at least 500 MPa or higher, determined according to ASTM D638 91) in order to impart the desired protection to the optical fibers housed therein. Said modulus should not however be too high, preferably below about 3000 MPa, in order to allow a tube with the selected thickness to be effectively compressed by the hydrostatic pressure caused by the water on the outer surface of the tube.

Suitable polymeric material for manufacturing said buffer tubes are, for instance, polybutylenterephtalate (PBT), polyethylene (PE), high density polyethylene (HDPE), polypropylene (PP), ethylene-propylene copolymers or polyammide (PA). According to a preferred embodiment, an ethylene-propylene copolymer can be used, such as the ethylene-propylene copolymer marketed by Fina Chemicals under the trademark FINAPRO 4640G.

The buffer tube (101) preferably has an outer diameter of from about 2.0 mm to about 6.0 mm, more preferably of from about 2.5 mm to about 4.0 mm.

The tubular passage (104), wherein optical fibers (105) are housed, preferably has a diameter (D1) of from about 1.0 mm to about 4.5 mm, more preferably of about 1.2 mm to about 3.0 mm.

The thickness of such buffer tube may vary from about 0.2 mm to about 0.6 mm, depending from the elastic modulus of the material and from the outer diameter of the tube, in order to protect the fibers during the manufacturing process and the cable installation. In addition, the thickness of the walls and elastic modulus of the material of said buffer tubes should be selected in such a way as to allow a substantial compression of said tube to take place in case of water penetration at the selected operative depth, in particular in correspondence with the minimal thickness (T1) of the buffer tube walls. Preferably, the minimal thickness (T1) of the buffer tube walls is of from about 0.2 mm to about 0.6 mm, more preferably of about 0.3 mm. Preferably, also the distance (T2), between the tubular passage 104 and the reinforcing element (102), and the distance (T3), between the reinforcing element and the outer surface of the buffer tube, will have a similar thickness. The longitudinal stiffness of the buffer tube can vary, depending from the dimensions of the tube and the Young modulus of the material, from about 100 to about 1000 Kg, preferably from about 300 to about 600 kg.

The reinforcing element (102), can be made of metal (e.g. steel), glass reinforced plastic, aramid fibers reinforced plastic, carbon fibers reinforced plastic or boron fibers reinforced plastic. Preferably said reinforcing element is a steel wire. The diameter D2 of said reinforcing element can be from about 0.3 mm to about 0.8 mm, depending from the dimensions of the buffer tube, preferably of from about 0.4 mm to about 0.65 mm. The longitudinal stiffness of the reinforcing element is preferably at least 4 times greater than the longitudinal stiffness of the polymeric buffer tube. Preferably said longitudinal stiffness is comprised from about 500 and 9000 kg, preferably from about 1500 to about 6000 kg. The Young modulus of the material forming the reinforcing element should be sufficiently high, in order to employ a reinforcing element with a relatively small cross-section. According to a preferred embodiment, the material employed for such reinforcing element is steel, having a Young modulus of about 180.000–200.000 MPa.

Preferably, the material forming said reinforcing element has an elastic limit of at least 0.2%, up to about, e.g., 0.5%. As known, the elastic limit of a material corresponds to the maximum elongation to which said material can be subjected, without incurring in permanent (non-elastic) deformation of the elongated element. Accordingly, the reinforcing element can be subjected to the relevant pulling strength during the manufacturing process, without undergoing to any undesired non-elastic deformation.

During the manufacturing stage of the buffer tube, as explained in the following, the reinforcing element is subjected to a predetermined longitudinal tension, thus allowing a precise control over the value of excess fiber length during the manufacturing process. In addition the presence of said reinforcing element embedded into the tube's polymeric wall, avoids the shrinkage of the tube during the post-manufacturing storage of the same. Finally, during the manufacturing process of the submarine cable, the presence of the reinforcing element allows the buffer tube to be pulled along the manufacturing line without the optical fibers housed therein being subjected to undesirable tensioning. Applicant has however noticed that after the buffer tube has been inserted into the final structure of the submarine cable, the pulling force to which the cable is subjected (e.g. during the loading and laying operations of the cable) is withstood by the armored structure of the cable, without any force being transmitted to the inner buffer tube. Accordingly, the reinforcing element can be suitably dimensioned in order to withstand the relatively low back tension applied during the manufacturing of the tube (or of the cable) and the compression caused by the shrinkage of the polymeric material. Thus the diameter of said reinforcing element can be rather small (typically less than 1 mm), allowing to manufacture buffer tubes of relatively small diameter, as there no need for such reinforcing member to withstand the typical pulling/compression strengths to which a cable is subjected during laying operations.

For instance, with reference to FIG. 1, a buffer tube made of ethylene-propylene copolymer (elastic modulus of about 900 MPa at 23° C.) inserted into a submarine cable intended to operate at a depth of about 6000–8000 m under the sea level, will preferably have an outer diameter of about 3.5 mm, a thickness T1 of about 0.25 mm, a tubular passage diameter D1 of about 2.2 mm and a steel wire reinforcing element with a diameter D2 of 0.5 mm (T2 being about 0.25 mm and T3 about 0.30 mm). In this case the longitudinal stiffness of the reinforcing element is about 7.2 times the longitudinal stiffness of the buffer tube.

A number of optical fibers (105) are housed inside the buffer tube (101), said optical fibers being immersed in a jelly-like filler.

The fibers are housed within the buffer with an excess length of from about 0% to about 0.1%.

Due to the presence of the reinforcing element, said excess length is strictly controlled during the manufacturing process and the subsequent storage of the buffer tube, in order to avoid any substantial fluctuation of the predetermined value, which would otherwise cause the fiber to contact the inner walls of the buffer tube, with consequent undesired attenuation of the transmitted signal due to microbending and/or macrobending phenomena.

Suitable jelly-like materials for filling the buffer tube (104) typically comprise a base oil, for example of the silicone, mineral (naphthenic or paraffin), or synthetic type (such as polyalphaolefins). This base oil typically requires the addition of a "viscosity improver" such as an elastomeric polymer with a low glass transition point, which by imparting viscosity to the solution improves its performance as a filling material. The filler composition may also contain an antioxidant and a thickening/thixotropic agent, consisting of more or less silanized pyrogenic silica. Examples of such filler composition are disclosed, for instance, in U.S. Pat. No. 5,455,881 or in European patent application no. EP 811,864.

Such jelly-like filler should have a viscosity sufficiently low to be easily introduced into the buffer tubes during the manufacturing process and to allow a substantially free relative movement of the fibers inside the tube. The viscosity of said jelly-like filler should however be sufficiently high in order to oppose a physical barrier to the longitudinal flow of water accidentally penetrated inside the tube. Typically, said jelly-like material will thus have a viscosity (determined using a Rheomat 115 Contraves viscometer at a shear rate of 1.56 sec.$^{-1}$) of from about 50 to about 220 Pa·s, preferably of from about 60 to about 150 Pa·s. Examples of jelly-like materials suitable for being used as water-blocking filler inside the above buffer tubes are LA444® (Info-Lab, Huber Group), H55 by SICPA.

As previously mentioned, the filling of the buffer tubes with the jelly-like material can be accomplished during manufacturing of the cable for only about 80–95% of the total internal volume of the tube, thus leaving about 5–20% of voids inside the buffer tube.

A layer of metallic wires (103) is then disposed in a helical lay around the buffer tube and presents the characteristics of an arch for withstanding pressure. In particular, as shown in FIG. 1, metallic wires of different diameter can advantageously be disposed in a double-helical lay according to the so-called Warrington structure. The outer surface of the buffer tube can be in contact with the surface of the metallic wires or, preferably, as shown in FIG. 1, a small gap of, for example, about 0.1–0.2 mm is left between said two surfaces. The metallic wires are typically made of steel. The outer diameter of the double-helical lay of metallic wires can be of about 7–9 mm.

A suitable water blocking material (e.g. elastomeric or jelly-like material, as previously mentioned) is discontinuously disposed in the interstices (106) between the outer surface of the buffer tube and the metal wires and in between the metal wires. In particular, as previously mentioned, said incomplete filling of the interstices is accomplished in such a manner as to leave a longitudinal passage along said interstices, wherein water accidentally penetrating inside the cable can flow with less head losses than inside the central buffer tube. Preferably, the elastomeric filling material is a water blocking hydrophobic elastomer, such as polyurethane resin.

The filling of the interstices is preferably accomplished in a discontinuous manner, in such a way that from about 10% to about 80%, preferably from about 20% to about 60% of the total length of the cavity is left free from the filler. For instance, a discontinuous filling can be accomplished by completely filling a number of longitudinal portions of the cavity with the water blocking material, each of said filled portions being separated by the subsequent filled portion by a portion substantially free from said filling material. For instance the filling material can be disposed in said cavity by filling lengths of from about 10 to about 50 m of said cavity, followed by similar length portions free from said material.

Advantageously, the water blocking material can be a polyurethane cross-linked elastomer, for instance a two part polyurethane elastomeric composition sold under the tradename "D ENCAPSULANT" by CasChem. The cavity can thus be filled, for instance, by about 30 meters with said elastomeric composition, the subsequent 20 meters of the cavity being then left free from the filling material, the further subsequent 30 meters being filled with the filling material, the further subsequent 20 meters being left free, the further subsequent 30 meters being filled again with the elastomeric material and so on.

Alternatively said filling compound can be a jelly-like material discontinuously disposed (2–10 meters filled portions separated by 20–50 meter empty portions) along said cavity. Said jelly-like material typically comprises (as the filler of the buffer tube) a base oil, a "viscosity improver" and optionally an antioxidant and a thickening/thixotropic agent. The composition of this jelly-like material will however preferably have a higher viscosity with respect to the one disposed inside the buffer tubes, which higher viscosity allows for a more effective barrier against longitudinal flow of water. The viscosity of said second jelly-like material can thus be of from about 200 to about 500 Pa·s, preferably of from about 300 to 400 Pa·s. Suitable jelly like materials are commercialized, for instance, by Amoco (CI500®) or by BP (NAPTEL® 947). Optionally, said jelly-like compositions can be provided with hydrogen adsorbing means such as, for instance, the compositions disclosed in U.S. Pat. Nos. 4,741,592 and 5,455,881. For further improving the water blocking properties of said filling material, a water swellable powder (i.e. a compound having the property of gelling/swelling upon water absorption), such as sodium polyacrylate or polymethacrylate, can be advantageously added to the jelly-like composition. The amount of said water-swellable powder may be in the range of from about 20% to about 70% by weight of the total composition, preferably in an amount of about 50%. Examples of suitable jelly-like material containing water swellable powders are disclosed, for example, in U.S. Pat. No. 5,715,343.

A tubular metal sheath (107) (e.g. of copper or aluminum) is then formed around the helical lay of metal wires. The thickness of the metal sheath is comprised between about 0.4 mm to about 0.8 mm, depending on the specific electrical resistance required for the cable. Preferably, said metal sheath is manufactured from a metal strip which, upon edge-folding and welding, results in a metal tube having a diameter larger than the one of the helical lay of metal wires (e.g. of about 2÷4 mm). The welded tube is then passed through reducing rollers thus reducing the outer diameter of the tube down to the final desired diameter while conforming it onto the metal wires. Advantageously, the diameter reduction of the tube also increases the yield strength of the metal material. For instance, the metal strip (e.g. copper) may have a thickness of about 0.52 mm and width of about 37.7 mm, such that upon folding and welding, the resulting tube has an outer diameter of about 12 mm; said diameter is then reduced down to a final outer diameter of about 9 mm, while the tube is conformed onto the helical lay of metal wires.

An outer polymeric sheath (108) is then disposed to surround formed metallic sheath. Said protective sheath has a thickness of e.g. 2.5–6 mm, preferably of from about 3 to about 5 mm, and can be advantageously made of Polyethylene (e.g. high density—HDPE—or medium density—MDPE).

A further layer of metallic wires (not shown), made of e.g. galvanized steel and, optionally, a layer of polymeric yarns (e.g. of polypropylene) can be helical disposed around the polymeric sheath in order to provide the desired armoring to the cable.

If desired, the protection of the cable can be further increased by stranding a second layer of metallic wires onto said polymeric sheath, which metallic wires are in turn sheathed with a respective outer polymeric yarn layer.

The submarine cable according to FIG. 1 can be typically manufactured in three separate stages. First the polymeric buffer tube with the optical fibers immersed into the filling material is manufactured by extrusion and wound on a take-up bobbin. The second stage of the manufacturing process comprises disposing the helical lay of the metal wires surrounding the buffer tube, together with the provision of the filling waterblocking material in the desired interstices, and disposing the metal sheath around the metal wires. The third stage (which can also be done on-line after the second stage), comprises the extrusion of the outer polymeric protective sheath.

Figure 4:
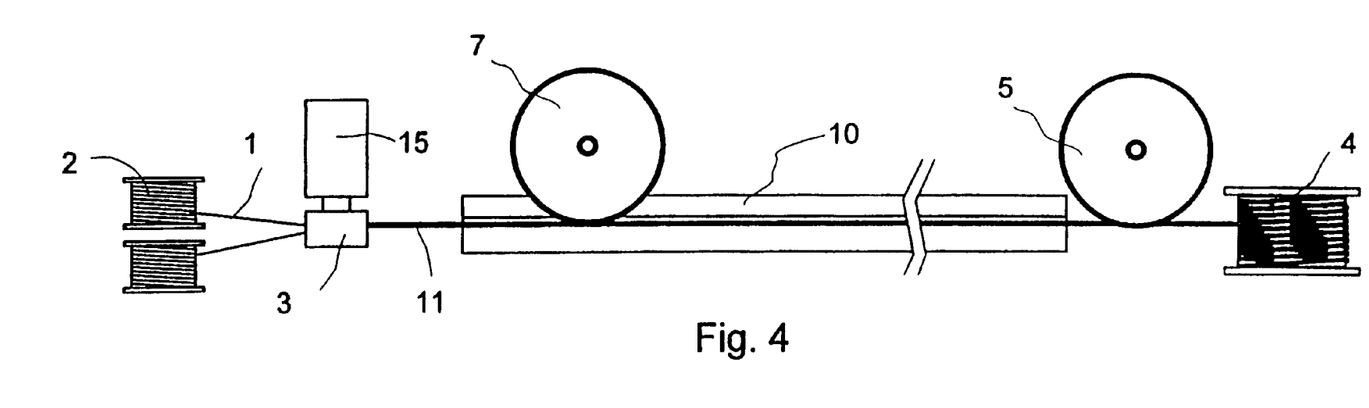
FIG. 4 shows a schematic diagram of an example of a manufacturing line of a polymeric buffer tube according to the invention.

In particular, the buffer tube can be produced on an extrusion line as depicted in FIG. 4. Said extrusion line typically comprises at least one pay-off bobbin from which one or more optical fibres 1 are taken, and at least one pay-off drum from which the reinforcing element is taken. Optical fibres and reinforcing element, maintained at specific values of back tension, are then sent to an extruder head 3, through which the plastic material is extruded around them, forming a tube 11.

At the same time the inner hole of the tube is filled with a filling compound. The tube 11 is then cooled into a cooling bath 10, pulled by means of a capstan (typically with a diameter of 600 mm to 1000 mm) and finally collected onto a final take-up bobbin 4.

The desired excess fiber length is achieved by adjusting the back tension of the fibers and the back tension of the reinforcing element, once all the other process condition (e.g. line geometry, cooling temperature, extrusion temperatures, temperature/viscosity of the filling compound, die geometry) are fixed.

Once determined the congruency point of the extrusion line (i.e. the point from which on fibers and tube proceed integrally with each other along the extrusion line), which depends from the process conditions, the excess fiber length is determined substantially by difference between the back tension applied on the reinforcing element and the back tension applied on the fibers; as a consequence, the precise control of the back tension of the fibers and of the reinforcing element allows a precise control of the final excess fiber length.

For instance, considering the 16 fibres count buffer tube having an outer diameter of 3.5 mm, an inner diameter of 2.2 mm and a stainless steel reinforcing element of 0.5 mm diameter, a fibre excess length of about 0.1% is obtained by applying a back tension of about 4 kg to the reinforcing element and of about 100 g to each fiber.

In addition, the presence of the longitudinal reinforcing element allows to maintain the excess fiber length constant during the storage of the buffer tube. In fact, as polymeric extruded materials are generally subjected to post-extrusion shrinkage phenomena, this would cause a reduction of the tube length with a consequent increase of the excess fiber length. However, the longitudinal reinforcing element withstands the compressive strength due to the tube shrinkage, thus maintaining constant the tube length and the fiber excess length.

By the above process it is thus possible to strictly control the variation of the value of excess fiber length within +/– the 0.02% with respect to the predetermined value. This control, which would not be possible in the absence of the reinforcing element embedded in the wall of the buffer tube, allows to manufacture submarine cables with polymeric buffer tubes of relatively reduced dimensions without any attenuation of the transmitted signal. On the other side, the absence of said reinforcing element results in uncontrolled variations of the length of the buffer tube and thus of the excess fiber length. This uncontrolled variation of the fiber excess length may then be incompatible with the reduced inner dimensions of the buffer tube, thus causing the fiber to contact the inner walls. As explained previously, this contact is the cause of the microbending/macrobending phenomena of the fiber which results eventually into an attenuation of the transmitted signal.

The optical core produced according to the previous description is then inserted in a metallic structure comprising two layer of metallic wires and an aluminum or, preferably, a copper sheath having the function of preventing the radial ingress of humidity in the core and to realize the appropriate electrical resistance. The two layers of metallic wires form a so-called "Warrington" structure, that withstands the water pressure after cable installation and confers the appropriate mechanical axial strength necessary for the cable laying and recovery operations.

The two layers of metallic wires are applied using a planetary stranding machine while the copper or aluminum sheath is applied forming a tube starting from a tape and welding longitudinally the abutted edges. The diameter of the tube is gradually reduced along the line up to realize a tight contact with the metallic wires.

During the laying of the metallic structure, the buffer tube and the metallic wires are subjected to a controlled back tension, so that the buffer tube contained into resulting cable has substantially the same length of the cable.

After the application of the layers of metallic wires and the metallic hermetic sheath, an insulating plastic sheath is applied with a normal process of extrusion, preferably on a separate extrusion line.

As mentioned along the above description, according to a preferred embodiment, a suitably dimensioned longitudinal cavity (or gap) is preferably provided around the inner polymeric buffer tube. The dimensions of said longitudinal cavity should be such that the head loss of the water flow through said longitudinal cavity is lower than the head loss of the water flowing inside said buffer tube. Thus, according to a preferred embodiment, in case of accidental ingress of water inside the submarine cable, the water flow inside the buffer tube is prevented from reaching long penetration lengths. On the other side, said lower head loss of the water flow through the cavity will allow the water to penetrate for a longer distance along said cavity than inside said buffer tubes. For instance, the penetration length of the water flow along said cavity can be about twice the penetration length of the water flow inside the buffer tube within 2 weeks, and up to about 10 times said penetration length.

In particular, the Applicant has observed that a preferred cable structure according to the present invention is particularly effective to block the water flow inside the buffer tube if the longitudinal cavity surrounding said buffer tube is dimensioned in such a manner that the head losses of the water flow along said longitudinal cavity are lower than about 75% of the head losses of the water flow inside the polymeric buffer tube, preferably lower than about 50%, and more preferably lower than about 30%.

Although not wishing to be bound by any particular theory, the applicant believes that by providing a longitudinal cavity with predetermined dimensions around a deformable buffer tube, the water accidentally penetrating inside said cavity causes a hydrostatic pressure to be generated onto the outer surface of the buffer tube, which pressure causes the buffer tube to be compressed, thus substantially reducing the empty volume inside the buffer tube and, consequently, the distance covered by the longitudinal flow of water inside said buffer tube.

Figure 2:
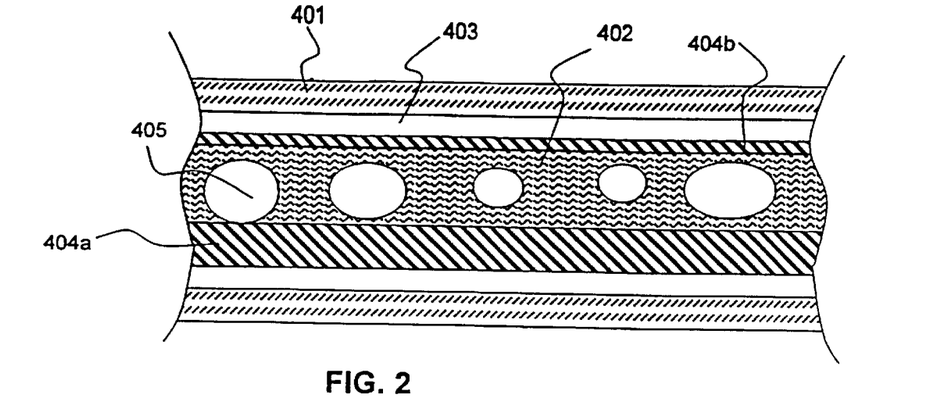
FIGS. 2 and 2a show a schematic longitudinal cross-section of a preferred embodiment of cable according to the invention before and after water ingress, respectively.
Figure 2A:
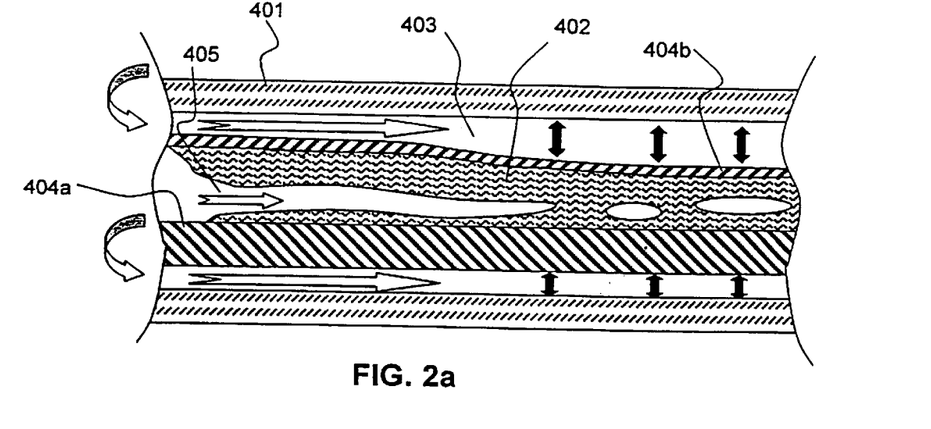

This supposed mechanism of water-block can be better understood by referring to FIGS. 2 and 2a.

FIG. 2 shows a schematic longitudinal cross-sectional view of the inner portion of a cable according to the invention, before water penetration, comprising a metal tube (401) surrounding a polymeric buffer tube defined by its walls (404a) and (404b), the two tubes being separated by the cavity (403). The walls 404b and 404a of the buffer tube correspond to the minimum thickness T1 and to the maximum thickness T2+D2+T3 (reference is made to FIG. 1) of the walls of the buffer tube, respectively. A filling mass (402) is disposed inside the buffer tube. As illustrated in the drawing, a number of voids (405) are present within the filling mass. For the sake of clarity, the optical fibers contained within the buffer tube have been avoided.

Upon water ingress (indicated by curved arrows in FIG. 2a), the longitudinal cavity (403), presenting a preferential path for the water flow, allows for a more rapid flow of water (indicated white straight arrows) along said cavity than inside the buffer tube. Few instants after the water inlet, the water will thus penetrate along said longitudinal cavity for a rather long distance (e.g., about 20–50 m after about 20–30 seconds). Said water surrounding the buffer tube will thus cause a hydrostatic pressure to act on the outer surface of the buffer tube (shown by black double-headed arrows in FIG. 2a).

On the other hand, after the same few instants, because of the relatively higher head losses to which it is subjected, the water flow inside the buffer tube will penetrate for a relatively shorter distance (e.g. less than few meters). Therefore, the hydrostatic pressure acting from the inside of the buffer tube will be limited to the initial portion of the tube, while after few meters the hydrostatic pressure will only act (due to the presence of water into the longitudinal cavity) on the outer surface of said tube. This will thus cause the buffer tube to be compressed, in particular in correspondence with its wall 404b having the minimal thickness T1, thus substantially reducing the void volume inside the mass of the filling material. The void volume reduction inside the buffer tube determines a corresponding reduction of the cross-sectional area through which water can flow, thus further increasing the head losses of the water flow, with a consequent further reduction of the distance covered by the longitudinal flow of water inside said buffer tube. In order to effectively reduce the void volume inside the buffer tube, the compression of said tube should be such as to reduce its original cross-sectional area of at least about 3%, preferably of at least 5%, when the tube is subjected to the relevant hydrostatic pressure.

In order to suitably control the water flow along the longitudinal cavity surrounding the buffer tube and block it within a predetermined length from the inlet zone, a water blocking material is disposed in said longitudinal cavity.

For instance, when the water blocking material is an elastomer or a gel-like filling composition which is discontinuously disposed along the longitudinal direction of said cavity, the water penetrated inside said cavity should be allowed to initially flow rather rapidly along said cavity. Thus, the discontinuous filling of the longitudinal cavity should be accomplished in such a way that a single portion of the material will cause a relatively low increase in the head losses of the water flow, in order to allow said flow to cover a sufficiently longer distance with respect to the flow inside the buffer tube and to allow the corresponding hydrostatic pressure to effectively compress said buffer tube. After flowing through a suitable number of subsequent portions of filling material (e.g. 3–5 portions), the head losses of the water flow will reach the limit value and the water flow will then be prevented from further flowing along the cavity. If desired, water swellable materials, e.g. in the form of powder, can be added to the filling composition, in order to increase the water blocking effect.

Applicant has further observed that in case the hydrostatic pressure caused by the water (or by the combined action of waterswelling powder and water) is relatively high, it may happen that the tube is subjected to a compression higher than the yield point at compression—of the polymeric material forming said tube. In this case, the tube can be permanently deformed by such pressure. In general, in case the compression of the tube is not higher than the yield point at compression of the material forming the tube, upon removal of the hydrostatic pressure (i.e. when the cable is brought at the sea level at atmospheric pressure), the buffer tube will recover its original dimensions.

The above mechanism of water-blocking is not necessarily limited to a buffer tube made of polymeric material, but can also be achieved by using other materials suitably dimensioned into a tube having a predetermined thickness of the walls such as to allow a substantial compression of said tube to take place in case of water penetration at the selected operative depth. In particular, said tube can advantageously contain a through hole in which optical fibers are housed, said through hole being not concentric with the longitudinal axis of the tube, in such a way that at least one portion of the wall of said tube have a minimal thickness T1, which portion is thus more preferably subjected to the hydrostatic compression at the relevant operative depth.

Figure 3:
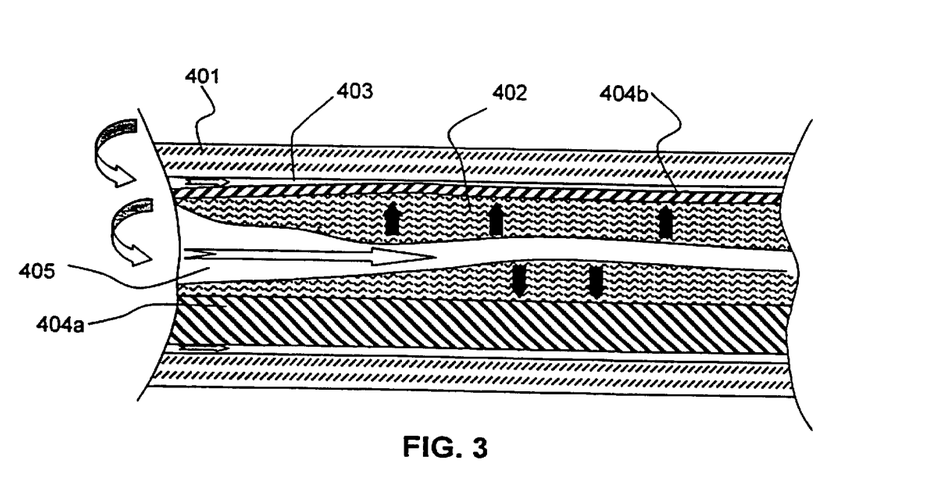
FIG. 3 show a schematic longitudinal cross-section of a comparative cable after water ingress.

FIG. 3 shows a comparative example of a cable wherein the longitudinal cavity surrounding the buffer tube is insufficient to operate according to the invention. In this case, the head losses of the water flowing within said cavity are higher than those generated onto the water flowing inside the buffer tube. Water will thus preferentially and more rapidly flow inside the buffer tube than along the longitudinal cavity, and the hydrostatic pressure (black arrows) will act in this case only from the inside of the buffer tube. The result of such hydrostatic pressure acting onto the walls of the buffer tube may be such as to increase the diameter of said tube, thus increasing the void volume inside the filling mass. As a consequence, head losses generated onto the water flowing inside the buffer tube will be further reduced, thus causing the water to penetrate for a substantial length along said buffer tube.

EXAMPLES

Example 1

Manufacturing of a Cable According to the Invention

With reference to the cable shown in FIG. 1, the following cable has been manufactured. The optical core of such cable comprises a central buffer tube made from FINAPRO 4640G polymer (Fina Chemicals), having an outer diameter of 3.0 mm, a 0.65 mm diameter steel reinforcing wire (Sandvik) and a 1.5 mm diameter tubular passage, filled with a silicon based gel (150 Pas at 20° C.) (SICPA). Eight LEA fibres (with a nominal attenuation as indicated in the following table 1) were disposed inside the buffer tube.

A double lay of steel wires having arch characteristics is helical disposed according to a "Warrington" structure around the buffer tube. The first layer is formed by 10 steel wires (1.405 mm diameter), while the second layer is formed by two sets of 10 steel wires each (1.2 and 0.85 mm diameter, respectively). The buffer tube is not in contact with the steel wires, but a gap of about 0.15 mm is left between the outer surface of the buffer tube and the surface of the inner lay of steel wires.

A flooding compound (polyurethane resin) has been alternatively inserted into the gaps around the tube and between the wires: 30 meters filled with the compound, 20 meters without it. Where the flooding compound is present, the amount is from 4.5 to 5.0 g/m. Considering that the specific weight of the compound is 0.915 kg/dm^3, the voids have been filled for about 75% to 85% of the total.

A copper sheath, manufactured from a UNS C10300 OFXLP (ASTM Standard) copper tape (Langenberg, Del.), having a width of 37.5 mm and a thickness of 0.52 mm is then conformed in the form of a tube onto the outer lay of steel wires.

After edge-cutting and folding, the tape is formed around the optical core into a tube of 12 mm diameter which is then TIG (tungsten inert gas) welded.

The welded tube is then reduced down to the final external diameter of 8.7 mm and conformed onto the outer lay of steel wires by passing it through reducing rollers.

An external sheath of medium density polyethylene is disposed to surround the copper sheath, up to a final external diameter of 18.5 mm of the submarine cable.

Example 2

Measures of Attenuation

The attenuation of the fibers contained in the so obtained cable has been measured and compared with the nominal attenuation values provided by the manufacturer.

The optical attenuation of the fibers inside the cable has been measured at 1550 nm with the back-scattering technique, using an ANRITSU mod. MW 90-60 A OTDR (optical time domain reflectometer).

The following table 1 shows the nominal attenuation values of the eight fibers and the attenuation values measured on the fibers inserted into the cable.

TABLE 1

Attenuation values

| Fiber no. | Nominal attenuation of the fibers (dB/km) | Attenuation of the fiber inside the cable (dB/km) |
|---|---|---|
| 1 | 0.211 | 0.212 |
| 2 | 0.220 | 0.220 |
| 3 | 0.204 | 0.202 |
| 4 | 0.203 | 0.203 |
| 5 | 0.211 | 0.199 |
| 6 | 0.215 | 0.203 |
| 7 | 0.201 | 0.208 |
| 8 | 0.201 | 0.198 |

As apparent from the above results, no substantial variation in the attenuation of the transmitted is observed when the fibers are disposed inside the cable.

Example 3

Water Penetration

The test has been carried out with using a 40 mm inner diameter steel pipe having a length of 880 m, capable of withstanding a hydrostatic pressure up to 550 bar. Rollers are disposed inside the test pipe in order to facilitate the insertion of the cable into the pipe.

The cable is inserted into the test pipe and one of its ends is hermetically sealed by welding a brass cup onto said end. The other end of the cable is sealed with a rupture disc device (FIKE Europe N.V.) capable of suddenly break at the predetermined test pressure (550 bar in this case).

Once both ends of the cable have been sealed, the test pipe is hermetically closed at its ends and filled with water to reach the desired test pressure of 550 bars. A dye (fluoresceine) is added to water in order to easier determining the water penetration length. Once the test pressure has been reached, the rupture disc device suddenly breaks, allowing the water to penetrate inside the cable with a pressure of about 550 bars. The pressure is then stabilized at the above value and the cable is maintained under this conditions for 7 days.

At the end of the seventh day, water is discharged from the test pipe and the cable is extracted and analyzed.

The penetration of water inside the buffer containing the optical fiber was less than 40 meters.

What is claimed is:

1. A submarine optical cable, comprising:

a polymeric buffer tube; and an elongated hollow body;

wherein the buffer tube comprises a peripheral wall, wherein the buffer tube further comprises at least one tubular passage, wherein the at least one tubular passage contains one or more optical fibers loosely housed in the at least one tubular passage, wherein the elongated hollow body is substantially non-deformable and hermetic, wherein the elongated hollow body comprises an inner surface and an outer surface, wherein the inner surface is disposed to longitudinally surround the buffer tube, wherein at least one reinforcing element longitudinally extends along an entire length of the buffer tube, and wherein the at least one reinforcing element is embedded in the peripheral wall.

2. The submarine optical cable of claim 1, wherein the at least one reinforcing element comprises a substantially-circular cross-section, and wherein a diameter of the substantially-circular cross-section is greater than about 0.3 mm and less than about 0.8 mm.

3. The submarine optical cable of claim 1, wherein the at least one reinforcing element comprises a substantially-circular cross-section, and wherein a diameter of the substantially-circular cross-section is greater than about 0.4 mm and less than about 0.6 mm.

4. The submarine optical cable of claim 1, wherein the at least one reinforcing element is a metal wire.

5. The submarine optical cable of claim 1, wherein a diameter of the at least one tubular passage is less than or equal to about 3 mm.

6. The submarine optical cable of claim 1, wherein a diameter of the buffer tube is less than about 6 mm.

7. The submarine optical cable of claim 1, wherein the at least one reinforcing element comprises a longitudinal stiffness at least four times greater than that of the buffer tube.

8. The submarine optical cable of claim 1, wherein a longitudinal cavity is defined between the peripheral wall and the inner surface, wherein the longitudinal cavity is at least partially filled with a water-blocking element, wherein the longitudinal cavity comprises a size such that, in case of ingress of water into the cable:

a water flow inside the buffer tube is caused to have a first head loss;

a water flow through the longitudinal cavity is caused to have a second head loss; and the second head loss is lower than the first head loss.

9. The submarine optical cable of claim 8, wherein the second head loss is lower than about 75% of the first head loss.

10. The submarine optical cable of claim 1, wherein the polymeric material forming the buffer tube is a polyester, a polyolefin, or a polyamide.

11. The submarine optical cable of claim 1, wherein the polymeric material forming the buffer tube is a polyethylene, a polypropylene, or an ethylene-propylene copolymer.

12. The submarine optical cable of claim 1, wherein the buffer tube comprises more than one layer of a polymeric material.

13. The submarine optical cable of claim 1, wherein the buffer tube comprises two or more layers of polymeric materials.

14. A submarine optical cable, comprising:

a polymeric buffer tube; and an elongated hollow body;

wherein the buffer tube comprises a peripheral wall, wherein the buffer tube further comprises at least one tubular passage, wherein the at least one tubular passage contains one or more optical fibers loosely housed in the at least one tubular passage, wherein the elongated hollow body is substantially non-deformable and hermetic, wherein the elongated hollow body comprises an inner surface and an outer surface, wherein the inner surface is disposed to longitudinally surround the buffer tube, wherein at least one reinforcing element longitudinally extends along an entire length of the buffer tube, wherein the at least one reinforcing element is embedded in the peripheral wall, and wherein the elongated hollow body comprises:

an inner layer; and an outer layer;

wherein the inner layer comprises at least one annular layer of metal wires, and wherein the outer layer comprises a metal tube.

15. The submarine optical cable of claim 14, wherein the at least one reinforcing element comprises a substantially-circular cross-section, and wherein a diameter of the substantially-circular cross-section is greater than about 0.3 mm and less than about 0.8 mm.

16. The submarine optical cable of claim 14, wherein the at least one reinforcing element comprises a substantially-circular cross-section, and wherein a diameter of the substantially-circular cross-section is greater than about 0.4 mm and less than about 0.6 mm.

17. The submarine optical cable of claim 14, wherein the at least one reinforcing element is a metal wire.

18. The submarine optical cable of claim 14, wherein a diameter of the at least one tubular passage is less than or equal to about 3 mm.

19. The submarine optical cable of claim 14, wherein a diameter of the buffer the is less than about 6 mm.

20. The submarine optical cable of claim 14, wherein the at least one reinforcing element comprises a longitudinal stiffness at least four times greater than that of the buffer tube.

21. The submarine optical cable of claim 14, wherein a longitudinal cavity is defined between the peripheral wall and the inner surface,
   wherein the longitudinal cavity is at least partially filled with a water-blocking element,
   wherein the longitudinal cavity comprises a size such that, in case of ingress of water into the cable:
      a water flow inside the buffer tube is caused to have a first head loss;
      a water flow through the longitudinal cavity is caused to have a second head loss; and
      the second head loss is lower than the first head loss.

22. The submarine optical cable of claim 21, wherein the second head loss is lower than about 75% of the first head loss.

23. The submarine optical cable of claim 14, wherein the polymeric material forming the buffer tube is a polyester, a polyolefin, or a polyamide.

24. The submarine optical cable of claim 14, wherein the polymeric material forming the buffer tube is a polyethylene, a polypropylene, or an ethylene-propylene copolymer.

25. The submarine optical cable of claim 14, wherein the buffer tube comprises more than one layer of a polymeric material.

26. The submarine optical cable of claim 14, wherein the buffer tube comprises two or more layers of polymeric materials.

27. The submarine optical cable of claim 14, wherein the at least one annular lay of metal wires comprises steel wires.

28. The submarine optical cable of claim 14, wherein the at least one annular lay of metal wires is wound as a helical lay around the buffer tube.

29. The submarine optical cable of claim 28, wherein the helical lay presents characteristics of an arch for withstanding a relevant hydrostatic pressure at a selected depth.

30. The submarine optical cable of claim 14, wherein the metal tube comprises copper or aluminum.

* * * * *

UNITED STATES PATENT AND TRADEMARK OFFICE
CERTIFICATE OF CORRECTION

PATENT NO. : 6,647,187 B2
DATED : November 11, 2003
INVENTOR(S) : Enrico Consonni et al.

It is certified that error appears in the above-identified patent and that said Letters Patent is hereby corrected as shown below:

Column 18,
Line 57, "layer of" should read -- lay of --.

Column 19,
Line 10, "buffer the is" should read -- buffer tube is --.

Signed and Sealed this

Twelfth Day of October, 2004

JON W. DUDAS
*Director of the United States Patent and Trademark Office*